United States Patent [19]

Lahm et al.

[11] 4,061,061
[45] Dec. 6, 1977

[54] AUTOMATIC TURRET LATHE

[75] Inventors: Heinrich Lahm, Esslingen-Sirnau; Dieter Gutbrod, Aichwald-Aichschiess, both of Germany

[73] Assignee: Index-Werke KG Hahn & Tessky, Esslingen, Germany

[21] Appl. No.: 760,109

[22] Filed: Jan. 17, 1977

Related U.S. Application Data

[62] Division of Ser. No. 691,347, June 1, 1976.

[51] Int. Cl.$^2$ .......................................... B23B 13/00
[52] U.S. Cl. ................................................. 82/2.5
[58] Field of Search ........................................ 82/2.5

[56] References Cited

U.S. PATENT DOCUMENTS

| | | | |
|---|---|---|---|
| 3,200,680 | 8/1965 | Coffin | 82/2.5 |
| 3,557,971 | 1/1971 | Tomiyama | 82/2.5 X |
| 3,696,696 | 10/1972 | Bechler | 82/2.5 |
| 3,927,583 | 12/1975 | Parsons | 82/2.5 |

*Primary Examiner*—Harrison L. Hinson
*Attorney, Agent, or Firm*—Olsen and Stephenson

[57] ABSTRACT

Lathe apparatus is disclosed which in one form is an automatic turret lathe in which a single turret head is provided that can support a plurality of tools for performing machining operations on inside and outside surfaces of a workpiece carried on the live spindle of the lathe. The axis of the turret head is disposed at a preferred angular relationship to the axis of the live spindle, and the receiving or mounting surfaces for the inside and outside machining tools are disposed alternately around the axis of the turret head in planar arrangements that provide optimum operating conditions for utilizing the outside and inside machining tools on a single turret head. An attachment for preturning of workpieces is provided which can be mounted on the headstock to perform cutting operations wherein the cutting tool is moved in response to movement of the turret carriage of the turret head. Another attachment is provided to facilitate supporting of the workpiece during the preturning of the workpiece. The lathe apparatus also includes a tailstock construction for synchronous axial adjustment with the live spindle and also to permit pivotal movement of the tailstock relative to the live spindle. An improved automatic feed of bar stock is also provided.

7 Claims, 11 Drawing Figures

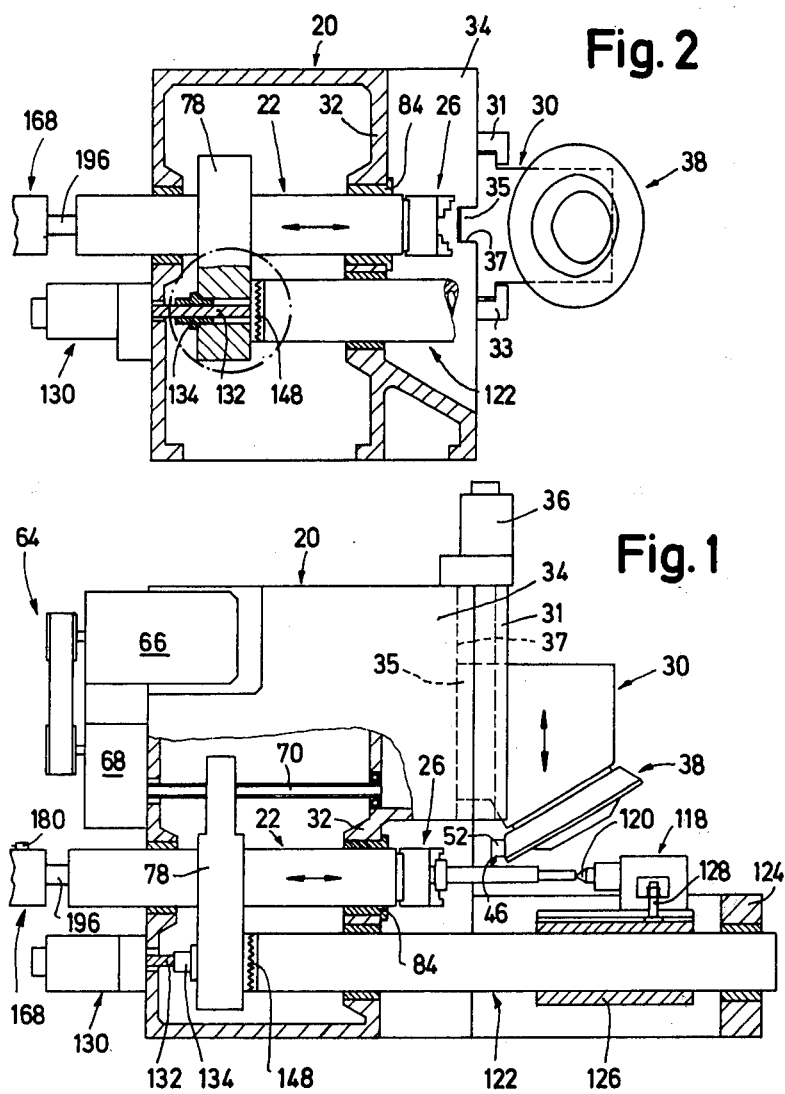

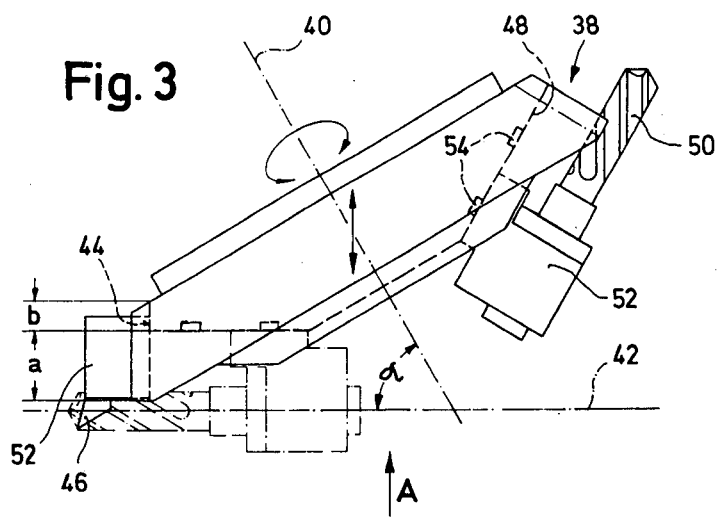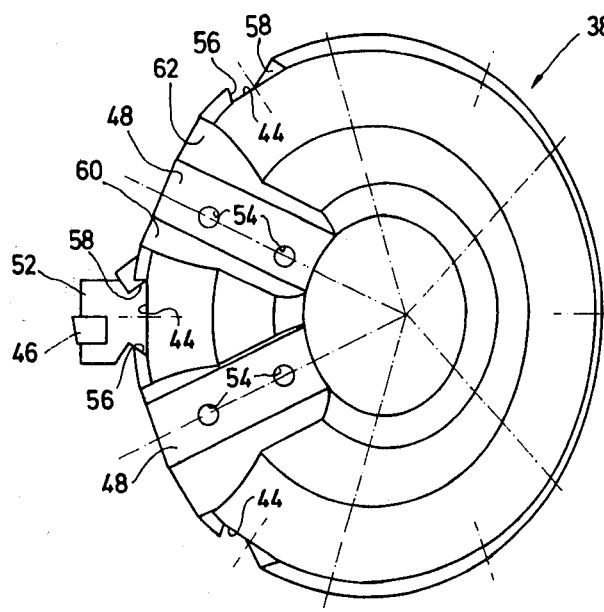

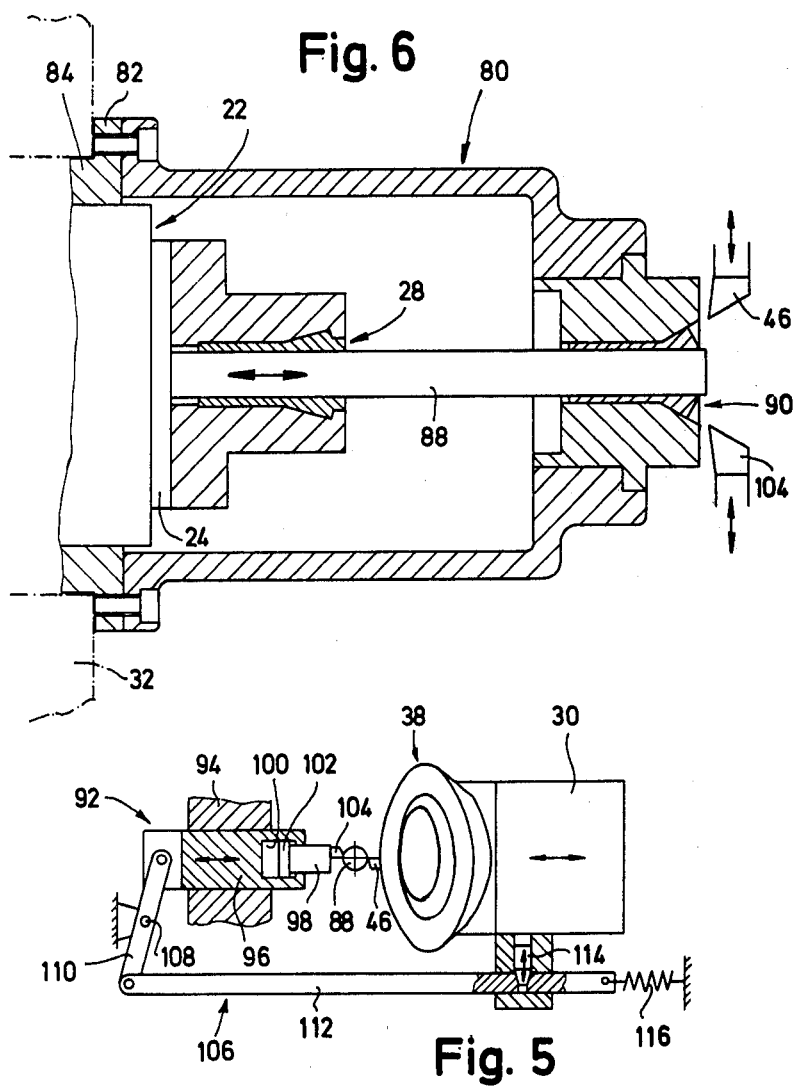

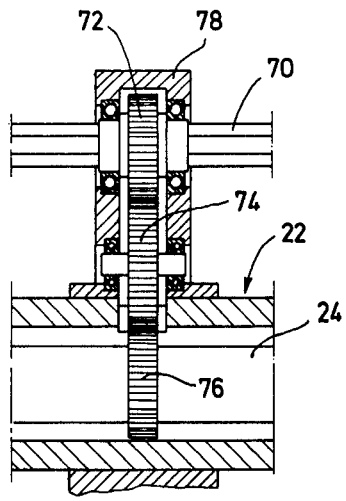
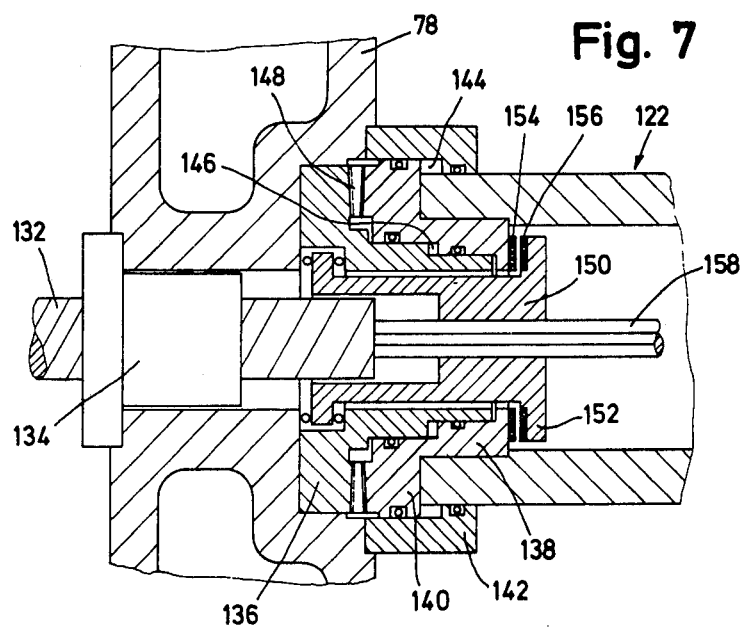

AUTOMATIC TURRET LATHE

This is a division of application Ser. No. 691,347, filed June 1, 1976.

REFERENCE TO RELATED APPLICATION

This application relates to copending application Ser. No. 691,413, filed June 1, 1976, entitled "Automatic Turret Lathe" corresponding to German Pat. application No. P 25 26 342.7-14.

BACKGROUND AND SUMMARY OF THE INVENTION

The invention relates to an automatic turret lathe with a live spindle supported in a headstock so as to be drivable in rotation and axially displaceable and with at least one turret head which is located laterally and in front of the live spindle on the headstock and is provided with tool receivers placed at an angular distance from each other.

An automatic turret lathe of the above-described type is known. In this machine, the turret head is placed parallel to the live spindle in the headstock and can be accordingly pivoted around its indexing axis for the plane setting of the tools (Disclosure of German Pat. application No. 1,477,170).

This type of plane tool setting requires a precise adjustment of the tool cutting edges on a cutting circle passing through the axis of the live spindle. This requirement limits the tool selection possibilities. Furthermore, a nonlinear path measuring system is necessary for plane setting, so that the feed to be performed on the basis of a movement on the arc of a circle can be compensated relative to a linear displacement. Finally, the setting angle of the tools depends on the part diameter.

It is one of the objects of the invention to provide an automatic turret lathe in which the disadvantages of the above-described design are avoided and the conditions are provided to obtain universal application for longitudinal turning, chuck work, rod and shaft machining with the simplest machine construction.

To realize this object, the invention applies to an automatic turret lathe with the characteristics of the above-described machine design, characterized by the fact that the turret head is located on a turret carriage which is mounted on the headstock so as to be adjustable perpendicular to the axis of the live spindle, is placed with its indexing axis at an acute angle to the axis of the live spindle, and carries the tools for outside as well as inside machining of the parts.

By equipping the automatic turret lathe with a turret head which can be adjusted radially to the live spindle for plane setting of the tools in connection with the axially adjustable live spindle, a cross-carriage system with the tools being fixed in the direction of the live spindle axis is obtained in these machines, creating optimum conditions with regard to tool arrangement and control as well as operating technology. The oblique arrangement of the indexing axis of the turret head to the live spindle axis at the same time allows favorable accommodation of all necessary auxiliary equipment in the working space for turning in the longitudinal direction as well as between end-points and to obtain a generally advantageous arrangement of tools.

A turret lathe is known in the prior art in which the turret head is placed on a carriage which is adjustable radially to the live spindle for plane setting of the tools (brochure of The Warner & Swasey Co., 1-SC, 1974). However, in this design the turret head is placed on the carriage so as to be axially parallel to the axially immobile live spindle and in addition to its indexing motion, also performs an axial feed motion. This leads to the disadvantage that the tools, referred to plane setting, must have a projection depending on the longitudinal stroke, so that their cutting edges must at least be positioned at a large distance from the plane feed path which has an unfavorable effect on precision.

Further, an automatic turret lathe is also known in the prior art in which the turret head is placed on a turret carriage with its indexing axis at an acute angle to the axis of the live spindle. However, in this design the tools for inside machining and those for outside machining are located on different turret heads, i.e., the tools for outside machining are located on a crown turret head, while those for inside machining are mounted on a star turret head (brochure of Cincinnati-NC Turning Centers, p. 15, 1972).

The dual arrangement of the turret heads in this known design requires a technically costly overall concept, because, on the one hand, one turret carriage each with the appropriate turret head indexing system must be provided for both turret heads, and, on the other hand, the well-known collision consideration must be be taken into account.

As for the design of the invention, it is favorable to place the turret carriage in a plane guide of the headstock which is essentially placed symmetrically to the axis of the axially displaceable live spindle, resulting in the important advantage that longitudinal guidance of the live spindle and plane guidance of the carriage are in a common plane, so that errors due to carriage tilting are eliminated.

In a preferred practical version of the invention, the indexing axis of the turret head is inclined 60° to the live spindle axis, so that particularly favorable space relationships result in the working space to accommodate a tailstock or other auxiliary equipment.

In view of the desired simplified machine construction, the headstock is designed in one part and at the same time forms the machine bed.

According to the characteristic of the invention, the turret head carries the tools both for outside and for inside machining. In a preferred version, the tool receivers on the turret head are provided for alternate placement of outside machining tools and inside machining tools, where at least the tool receivers for outside machining tools are located on the periphery of the turret head and the tool receivers for inside machining tools are placed perpendicular to the former. Apart from the fact that this arrangement of outside and inside machining tools on the turret head makes an additional turret head unnecessary, the alternate arrangement of inside and outside machining tools makes it possible to use rotary inside tools to advantage on the turret head. In a special further refinement of the invention, the tool receivers are formed by at least one receiving surface, of which those for outside machining tools, when in working position, are located in a plane perpendicular to and penetrated by the live spindle axis, while the receiving surfaces for the inside machining tools, in their working position, are located in a plane parallel to the live spindle axis. It is of advantage if the preferably plane tool receiving surfaces form the base of groove-like depressions of the turret head. The walls of these groove-like depressions receiving the tool holders for inside machining tools will advantageously have a concave curvature, so that the turret head for inside machining of parts can be driven directly in front of the part clamping site of the live spindle, where the parts can enter the depressions of the turret head.

In a further favorable refinement of the invention, the tool holders of the outside machining tools are adjustable and lockable on the respective receiving surfaces of the turret head perpendicular to the live spindle axis and the tool holders for the inside machining tools are adjustable and fixable on the respective receiving surfaces parallel to the live spindle. Such an adjustability offers the further important advantage that the cutting edges of the outside and inside machining tools can be adjusted to an aproximately identical cutting circle, so that bridging of the position distances otherwise present on turret heads in their set working position by means of an additional carriage path becomes unnecessary. Thus, shorter paths of the turret carriage and therefore, shorter and smaller construction components and auxiliary equipment will be sufficient.

In a special version of the invention, the position of the tool receiving surfaces for the inside machining tools in the turret head in their working position is selected such that when the turret head is projected on a plane through the indexing axis and live spindle axis, the distance of these tool receiving surfaces from the end of the neighboring receiving surfaces for outside machining tools, oriented toward the front turret head face, is greater by multiple than their distance from the end of the receiving surfaces for the outside machining tools, oriented toward the back face of the turret head. On the basis of the arrangement of the tool receiving surfaces for the outside machining tools perpendicular to the receiving surfaces for the inside machining tools, referred to their working position, the tool receiving surfaces for inside machining tools can have a optimum length with a compact turret head diameter with a relatively small axial dimension of the turret head, particularly also with consideration of its oblique placement at an angle of especially 60° to the live spindle axis. This is optimum because the ratio of the length of the clamping area to the size of the tool holders and tools favors the desired approximately identical cutting-edge position of both types of tools. The possibility of adjusting the tools in such a way that their cutting edges essentially can be adjusted to a common working point offers the further advantage of a collision-free indexing of the tools, so that the working range can be further expanded by the fact that the outside machining tools, if desired, can be mounted on the receiving surfaces for the inside machining tools with a displacement of these receiving surfaces in longitudinal direction.

Furthermore, the automatic turret lathe is characterized by a preferably removable preturning device which can be used for plain turning and has a carriage which is guided in the headstock and carries a tool holder and which can be coupled mechanically preferably with the turret carriage for its drive. The carriage of this preturning device, when referred to the live spindle, is advantageously placed to be diametrically opposite the turret carriage and can be coupled with the latter via a lever drive in such a way that their feed displacements are in opposite direction and coincide with each other. Accordingly, only one transverse drive is needed for radial control of the turret carriage and the preturning device.

In order to allow an advantageous performance of plain turning in accordance with the objective of the present invention, a further refinement of the invention allows mounting of a guide system overlapping the spindle head of the live spindle and mounted coaxially to the live spindle on the headstock, by means of which plain turning parts can be maintained to be rotatable in the immediate zone before the point of attack of the tool cutting edges. Furthermore, to perform turning work, a tailstock is placed between the ends of the live spindle, for which purpose a tailstock sleeve is provided in the headstock parallel to the live spindle so as to be rotatably and axially displaceable and axially adjustable synchronously with the live spindle by the same path distances. For a synchronous axial adjustment of the live spindle and tailstock sleeve, a common adjustment device is of advantage by means of which a drive dog can be adjusted through which the live spindle as well as the tailstock sleeve can be simultaneously adjusted in the lengthwise direction. So that it will not be necessary to move the drive device for the live spindle together with the latter during feed movements and accordingly maintain the moving masses at a minimum, the drive dog forms a fixed transmission housing on the sleeve-like bearing housing of the live spindle in order to accommodate an auxiliary transmission, by means of which the live spindle can be driven in rotation by a stationary drive system. The drive system is advantageously provided with a driven shaft driving the auxiliary transmission and extending parallel to the sleeve-like bearing housing of the live spindle, this shaft passing through the drive dog and the latter being displaceably guided on it. So that the lathe center of the tailstock can be brought from its operating position into the standby position, if no turning between ends is to be done, the tailstock sleeve is designed so that it can be twisted and the tailstock can be pivoted back and forth between the two mentioned positions. At the same time, provision is made for the adjustment device providing the longitudinal displacement of the live spindle and tailstock sleeve will be used simultaneously for the rotational drive to turn the tailstock sleeve.

The axial adjustment of the live spindle can be realized technically with particular advantage if it is supported so that it can be driven in rotation in a bearing housing formed as a sleeve and placed into the headstock so as to be axially displaceable.

The invention furthermore deals with an automatic feed of a material bar inserted into the live spindle of a turret lathe, particularly an automatic turret lathe, for which the axial motion of the working spindle is utilized according to the invention. In order to realize such an automatic material feed, a guide piece of a bar feed-guide device holding the material bar is provided, extending into the live spindle from its back end and a supporting member which can be mounted to the back end of the material bar is guided on this guide device in such a way that it can be adjusted relative to the guide piece only with an axial motion of the live spindle taking place in the feed direction. This assures that the material bar, when it is transported by the live spindle in the direction of the machine working space remains in the feed position when the live spindle is retracted again after release of the material clamping device by finding support at the guide piece via the support member, while the feed path of the live spindle is suitably adjusted to the desired part length. It is of advantage here to provide the end of the guide piece located in the interior of the live spindle, preferably immediately in front of its material clamping device, with a stop on which the supporting member can be arrested in order to activate a shut-off device to shut down the machine when the material bar has been consumed. A particularly favorable design results in this connection if the guide piece has a tubular form and the supporting member is formed by a sliding piece which adjoins the latter at the inside circumference with friction and is attachable and clampable to the back end of the material bars to be machined. The preferably tubular guide piece can be fixed relative to the live spindle, so that the guide piece forming the supporting member will shift relative to the guide tube even during the feed motion of the live spindle. However, it is of advantage to refine the design in such a way that a relative motion between guide tube and slide piece takes place only for the purpose of the material bar feed and the two parts will move together with the live spindle during the working feed through the latter, so that wear of the slide piece will be limited to a minimum.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a partially top view of the automatic turret lathe according to the invention;

FIG. 2 is a partial front view of the automatic turret lathe in which the headstock is shown schematically;

FIG. 3 is an enlarged top view of the turret head of the automatic turret lathe;

FIG. 4 is a view of the turret head as seen in the direction of arrow A of FIG. 3;

FIG. 5 is a view partly in section of a preturning device to perform preturning work in plain turning which can be mounted on the headstock;

FIG. 6 is a section through guide device which can be mounted on the headstock for guiding and supporting the material bar during plain turning;

FIG. 7 is a section indicated by a dash-dot circle in FIG. 2 on a larger scale and in longitudinal section;

FIG. 8 is a view, in the longitudinal direction, of the drive dog forming a transmission housing for simultaneous axial displacement of the live spindle and tailstock sleeve;

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 9:
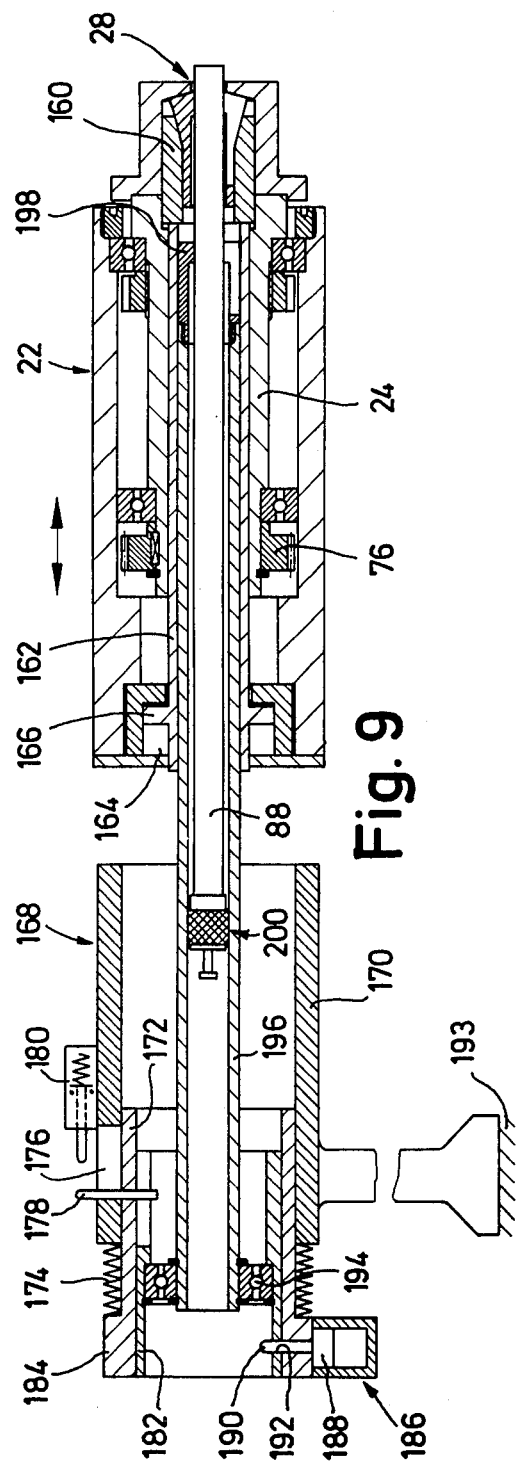
FIG. 9 is a longitudinal section of the spindle bearing housing in the form of a sleeve in connection with a stationary guide part of a bar feed-guide device serving for the feed of a material bar inserted in the live spindle.
Figure 11:
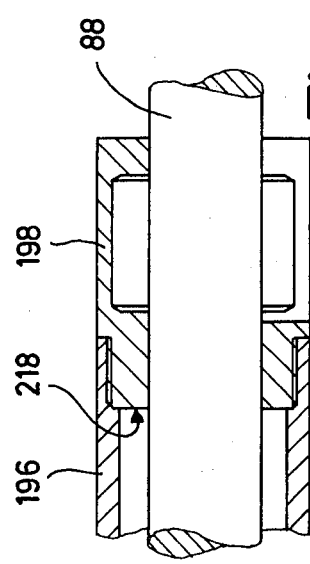
FIG. 11 is a longitudinal section through the front end of the guide tube of the guide device formed as a collet chuck together with a material bar.

The automatic turret lathe shown in the drawing has a one-piece box-like headstock 20 also forming the machine bed in which a sleeve-like horizontally supported spindle bearing housing 22 is placed which can be axially displaced in both directions. In this spindle bearing housing, a live spindle designated by 24 in FIG. 9 is supported so that it can be driven in rotation, carrying a chuck 26 at its spindle head in the example of FIG. 1, while in the example of FIG. 9, it is provided with a collet chuck 28. A turret carriage designated by 30 as a unit is assigned to the live spindle and is guided in guide rails 31 and 33, so as to be displaceable in both directions by a drive means or device 36, both horizontally and perpendicular to the axis of the live spindle at the front part of a partial housing piece 34 extended in the forward direction relative to the housing piece 32 accommodating the spindle bearing housing 22. A guide piece molded onto the turret carriage is designated by 35 and is guided in a suitable guide groove 37 of the headstock. The turret carriage 30 carries a turret head designated by 38 as a unit, the indexing axis 40 of which is arranged at an inclination at an angle a of 60° relative to the axis 42 of live spindle 24. Furthermore, both axes are preferably in a common place. The turret carriage guide system 31, 33, 35 is placed approximately symmetrical to axis 42 of live spindle 24. The turret head 38 has plane receiving surfaces 44 for outside machining tools 46 and plane receiving surfaces 48 for inside machining tools 50. As shown by FIG. 3, the receiving surfaces 44 for the outside machining tools 46 are in a plane perpendicular to and penetrated by the live spindle axis 42. Receiving surfaces 48, in their adjusted working position, are perpendicular to receiving surfaces 44 and placed into a plane parallel to the live spindle axis 42. Recieving surfaces 44, 48, according to FIG. 4, are furthermore provided in alternate arrangement, where the position of receiving surfaces 48 for the inside machining tools, in their adjusted working position and according to FIG. 3, are selected in such a way in the projection of the turret head on a plane through the indexing axis 40 and live spindle axis 42 that their distance a from the end of the neighboring receiving surfaces 44 for the outside machining tools oriented toward the front turret head face is greater by a multiple than their distance b from the end of receiving surfaces 44 oriented toward the back turret head face. This reciprocal assignment of receiving surfaces and the inclined position of the turret head to the live spindle allows a relatively long design of the receiving surfaces 48 for the inside machining tools with a relatively small turret head diameter and a relatively small axial dimension of the turret head, and thus also permits relatively long inside machining tools, for example, drills, to be positioned in the turret head in such a way that the cutting edges of the outside and inside machining tools 46, 50 can be adjusted approximately at the same working point. This adjustment possibility offers the important advantage that the outside and inside machining of corresponding parts can be performed with the outside and inside machining tools with a constant axial adjustment of the live spindle in order to perform the feed, when necessary. Thus, the usual performance of additional feed steps to bridge position deviations and cutting edge distances of the cutting edges of outside and inside machining tools set into their working position thus become unnecessary, i.e. the special reciprocal positioning of the receiving surfaces 44, 48 makes it possible to set the next tool without collisions with shorter feed paths and shorter turret carriage paths and after brief lifting of a tool cutting edge from the part. Furthermore, particularly because of the oblique arrangement of the turret head to the live spindle axis, inside machining tools which are operated by rotation, can be favorably accommodated at the turret head on receiving surfaces 48 and in addition, they are readily accessible from the operating side of the machine. The inside and outside machining tools at the same time are mounted in the conventional manner in tool holders 52, where at least the receiving surfaces 48 for the inside machining tools are provided with several spaced mounting points 54 in order to allow positioning of the respective tool holders 52 in a suitable position on these surfaces. To mount the tool holders 52 for the outside machining tools, the corresponding receiving surfaces 44 preferably represent the base of a dovetail guide, the side walls 56, 58 of which are inclined toward each other and engage positively with corresponding longitudinal grooves of tool holders 52. These tool holders can be set in predetermined positions by means of set screws which are not shown in detail in the drawing.

Receiving surfaces 48 for the inside machining tools form the base of groove-like recesses, the side walls 60, 62 of which have a concave curvature. The arrangement of these groove-like depressions is made in such a way that when they are in the set working position, they define a recess extending coaxially with respect to the live spindle which can be entered appropriately by rotation-symmetrical parts for the performance of inside machining operations.

The rotary drive of live spindle 24 is obtained by a stationary drive means or system 64 located at the headstock 20 and consisting of drive motor 66 and transmission 68. A driven shaft designated by 70 in this transmission 68 is supported parallel to the spindle bearing housing 22 which is axially displaceable for the purpose of performing the feed in the headstock 20 and the live spindle 24 is rotated via the stationary drive system 64 via an intermediate transmission provided with bevel gears 72, 74, 76. The intermediate transmission is accommodated in a transmission housing 78 which is mounted on the spindle bearing housing 22 in an axially rigid manner and is penetrated by the driven shaft 70 of the drive system 64. The latter, for example, forms a spline shaft on which the drive gear 72 of the auxiliary transmission is displaceably mounted which meshes with the intermediate gear 74 supported rotatably in the transmission housing 78 and this in turn drives the driven geat wheel 76 mounted on live spindle 24.

By means of the automatic turret lathe designed to the extent described above, it was possible to provide optimum conditions from the control and practical engineering standpoint for universal application of the machine to chucking, bar or shaft machining as well as to plain turning or center turning.

FIG. 6 shows a guide system designated as a unit by 80 for performing plain turning work which can be bolted coaxially to the spindle bearing housing 22 to a mounting flange 82 of a front bearing bushing 84 holding the spindle bearing housing. This guide system can be mounted to the machine if a collet chuck 28 according to FIG. 9 is provided to clamp a material bar or bar stock 88 in the head of live spindle 24 instead of a jaw chuck 26 (FIGS. 1 and 2). The guide system forms a carrier bell-jar which is equipped with a guide clamp 90 at its front face located coaxially to collet chuck 28, the guide clamp being adjustable in such a way that the material bar 88 can displace axially with free rotation. Plain turning parts can be reliably supported in the immediate zone in front of the point of attack of tool cutting edges 46, 104 by means of the guide system.

To perform preturning work for plain turning, a preturning device 92 shown schematically in FIG. 5 can furthermore be mounted to the headstock which has a carriage support 94 mountable to the latter for this purpose in which a tool carriage 96 is displaceably supported radial to the live spindle and has a tool holder at its front face oriented toward the live spindle, the tool holder being preferably formed by the piston rod 98 of a piston 102 guided in a cylinder 100 and being suitable for clamping a preturning chisel 104. A lever drive 106 having a double lever arm 110 with lever arms of identical length supported on a stationary bearing shaft 108 connected, for example, with carriage support 94 serves to control the part carriage 96 and this double-arm lever 110 can be pivoted via a transmission rod 112 directly through the turret carriage 30, where the connection of these parts is produced by means of a coupling bolt 114 and can be opened by axial displacement of the latter. A tension spring 116 attacking at the transmission rod 112 continuously tends to retract the tool carriage 96 into its initial position. The lever drive 106 thus assures that the tool carriage 96 placed diametrically to the turret carriage, with reference to the material bar 88, is adjusted in the direction opposite to the direction of movement of the turret carriage by the same amounts, where the tool receiver 98 by means of piston 102 can also be brought into the disengagement position independent of the lever drive 106 and can be set relative to the material bar.

As shown by FIG. 1, the automatic turret lathe is also equipped with a tailstock designated as a unit by 118 in order to allow center turning or, as shown in FIG. 1, to allow centering of the tailstock 118 at the rear end by means of centering punch 120. For this purpose, a tailstock sleeve designated as a whole by 122 is arranged so as to be rotatable and axially displaceable parallel to the live spindle and—as shown in FIG. 2—in a plane below the latter in headstock 20, which sleeve is held at its front end in a jib 124. A tailstock holder 126 is attached on this tailstock sleeve on which the tailstock 118 is mounted to be infinitely variable and lockable, for example, by means of a turnbuckle 128. The tailstock holder 126 is placed on tailstock holder sleeve 122 so that it can be locked, so that both parts are adjustable together and synchronously to the spindle bearing housing 22 by the same path distances in axial direction. For this purpose, the transmission housing 78 of auxiliary transmission 72, 74, 76 forms a drive dog through which the spindle bearing housing 22 and tailstock carrier sleeve 122 can be axially displaced simultaneously on one hand, and from which the tailstock sleeve can be disengaged in order to turn it for the purpose of inside machining operations and thus allow the tailstock 118 to be pivoted from its operating position according to FIG. 1 into a standby position. The axial displacement of spindle bearing housing 22 and tailstock sleeve 122 is provided by a common adjustment system or means designated as a unit by 130 located at the headstock 20, preferably aligned with the tailstock sleeve, and drivable by a worm-gear spindle 132, the rotational motion of which can be converted into linear motion via a threaded nut 134 rigidly mounted on the transmission housing or dog 78 in order to adjust the dog and the spindle bearing housing 22 and the tailstock sleeve 122. At the same time, the adjustment system 130 also serves to turn the tailstock sleeve 122 in order to pivot tailstock 118. For this purpose, a rotation-symmetrical guide body 136 is located coaxially to the tailstock sleeve 122 on dog 78 with a flange bushing 138 guided in axially displaceable manner which is inserted rigidly into one front face of the tailstock sleeve 122 and projects with its outer flange 140 in radial direction over the circumference of the tailstock sleeve. At the same time, this flange forms a piston guided displaceably but in a pressure-tight manner in a guide cylinder 142 mounted coaxially to the guide body 136 on dog 78. Guide cylinder 142, flange or piston 140 as well as guide body 136 define two annular pressure chambers 144, 146 in which a pressure medium, preferably hydraulic oil, can be alternately introduced. The supply ducts are not shown for the sake of simplicity. Furthermore, guide bodies 136 and flange 140 of flange bushing 138 are each provided with a Hirth gearing 148 on their facing front faces which can be meshed positively with each other in order to couple the tailstock sleeve 122 with dog 78. For this purpose, hydraulic oil is introduced into annular space 144 so that flange 140 is applied on guide body 136 with pressure. A rotor 150 is rotatably supported in guide body 136 coaxial to the worm-gear spindle 132 of adjustment system 130 and extends into tailstock sleeve 122 where its end has an outer flange 152. This outer flange forms the coupling half of a further coupling formed together with flange bushing 138, for which purpose the flange bushing is provided with a friction lining 154 on its front face turned toward the outer flange 152 of the rotor; the friction lining can interact with a corresponding friction lining 156 of the outer flange 152 of the rotor. The rotor drive 150 is obtained by a spline shaft 158 molded onto worm-gear spindle 132. Rotor flange 152, in the coupled state of tailstock sleeve 122 with dog 78, has such a distance from the friction lining 154 of flange bushing 138 that when these parts are uncoupled, both friction linings 154, 156 are pressed against each other by introducing hydraulic oil into the annular space 146, so that the rotational motion of the worm-gear spindle 132 will cause turning of the tailstock sleeve 122 during the axial displacement of the spindle bearing housing 22 and tailstock sleeve 122 produced by dog 78. The desired angle of rotation of the tailstock sleeve 122 in order to pivot the tailstock 118 out of position can be programmed as the longitudinal spindle path by numerical control and thus corresponds to the angular rotation of worm-gear spindle 132. The axial path simultaneously covered by the live spindle 24 is considered in the further program as a suitably rounded amount of, for example, 2mm. When the tailstock is returned into position, the rotational motion of the tailstock sleeve occurs in the opposite direction. During work with the tailstock, the inside machining tools on receiving surfaces 48 of the turret head 38 can also be replaced by outside machining tools in such a way that they are off-set from station to station along the receiving surfaces 48 in accordance with the position of the mounting points 54. Consequently, every tool can be used in a range corresponding to the maximum travel distance of the live spindle, so that a part length which is effectively enlarged by the maximum displacement of the tools can be machined. The adjustable and lockable arrangement of the tailstock holder 126 on the tailstock sleeve 122 furthermore allows the tailstock holder 126 to be designed as a multiple tool carrier which can accept stationary as well as rotational tools and these can be pivoted into the working position as described. During the feed movement of the tailstock sleeve 122, the tailstock 126 is maintained in position by suitable means.

The automatic turret lathe is equipped with an automatic material bar feed device, where the live spindle simultaneously forms a functional part of this device. As shown in FIG. 9, the live spindle is equipped with a collet chuck 28, for example, which is operable in the known manner by means of a pressure sleeve 160, which in turn can be axially displaced, for example, by a pushout tube 162 located within the live spindle which in turn can be operated by an axially displaceable piston 166 guided in cylinder 164. This material bar feed device has a feed guide system 168 coaxial to the back end of spindle bearing housing 22 and mounted to a stand 193. It is formed by a guide body 170 in the form of a hollow cylinder mounted to headstock 20 and in it, a receiving sleeve 172 can be axially adjusted against the action of a compression spring 174 supported on guide body 170. The receiving sleeve carries, for example, a pin-like indexing member 178 engaging through a longitudinal slot 176 of the guide body and provided with a shutoff device 180 on the guide body. A guide sleeve 182 is guided in axially displaceable manner in receiving sleeve 172 and can be coupled with the receiving sleeve 172 in a predetermined position as shown in FIG. 9, for which purpose a cylinder attachment 186 is preferably provided on an outer flange 184 of the end piece of the receiving sleeve projecting from guide body 170; the piston 188 of this attachment with its piston rod 190 can be driven into a corresponding radial recess 192 of the guide sleeve. In the guide sleeve, a guide tube 196 projects from its back end into the live spindle and into the displaceable pushout tube 162 that is provided in it with the use of a ball bearing 194, and the front end of this guide tube is provided with a clamp-like shutoff sleeve 198 held with positive friction on the material bar 88; the purpose of the shutoff sleeve will be discussed further below.

Figure 10:
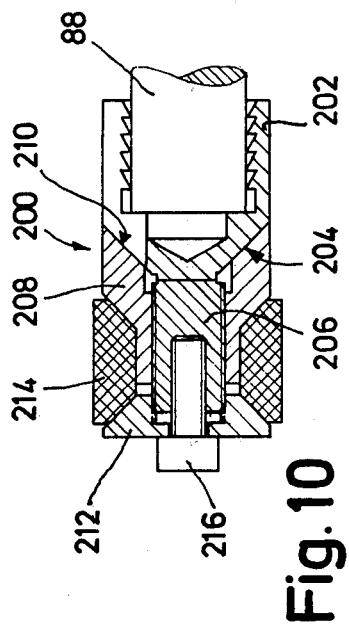
FIG. 10 is an enlarged longitudinal section through the support member of the bar feed-guide device formed as a sliding piece which is attached to the back end of a material bar.

The guide tube 196 contains a supporting member which is shown in detail in one possible version in FIG. 10 and which can be attached on the back end of the respective material or stock bar 88 by means of a clamp-like mouthpiece 202. This mouthpiece has a conical surface 204 onto which a threaded shaft 206 is centrally molded. A receiving body 208 is attached to the latter which positively applies to the conical surface 204 of the mouthpiece with an inside conical surface 210. A pressure plate 212 can be screwed onto the threaded shaft which together with receiving body 208 defines a circumferential groove with an approximate V-shaped cross section into which a cylindrical friction ring 214 is inserted consisting of a material with a high coefficient of friction, e.g., a suitable plastic. By tightening a screw or turnbuckle 216 passing through the pressure plate and insertable into the threaded shaft 206, the diameter of the friction ring can be adjusted in such a way that its circumferential surface applies to the inside circumference of the guide tube 196 at a relatively high radial pressure and the frictional resistance generated can be overcome only with a certain force. For mounting the supporting member on the back end piece of the material bar, the receiving body 208, after attaching its mouthpiece 202, is to be tightened, for example, by means of a wrench, until the clamp legs of the mouthpiece are applied on the bar circumference with a pressure which results in a frictional resistance higher than the frictional resistance between friction ring and guide tube.

The operation of the bar feed device will be described further below.

At the start of a working program, the spindle bearing housing 22 with the clamped collet chuck 28 of the live spindle 24 moves into its left end position, while the guide tube 196 according to FIG. 9 is moved to the left via material bar 88 and supporting member 200. Once the end position is reached, the guide sleeve 182 is coupled to the receiving sleeve 172 by means of piston rod 190 of the cylinder aggregate 186. In accordance with the required part length, the spindle bearing housing or live spindle 24 with the clamped material bar is moved to the right with a displacement instruction according to FIG. 9, while the guide tube 196 is maintained in fixed position against the resistance of the compression spring 174 braced on outer flange 184 of the receiving sleeve and the stationary guide body 170. As a result, the material bar 88 is moved to the right together with the live spindle against the frictional resistance of support member 200. Subsequently, the collet chuck 28 is disengaged and the live spindle and spindle bearing housing is again driven to the left according to FIG. 9, while the material bar 88 is now necessarily braced at the support member 200 kept in the guide tube by friction and thus remains stationary together with the guide tube 196. When the live spindle has reached its end position on the left, its collet chuck 28 is tightened again, the coupling between the two sleeves, 178, 182 is opened and the working program is subsequently performed on the part. In this process, the guide tube 196 performs all motions of the live spindle and spindle bearing housing together with the guide sleeve 182 during the individual operations of the cycle. After consumption of the respective material bar, the mouthpiece 202 of the supporting member 200 moves to the front face 218 of the shutoff sleeve 198 facing it at the front end of the guide tube and thus necessarily takes along the guide tube 196 in this direction against the resistance of the compression spring 174 during performance of a further feed displacement, so that the shutoff device 180 is operated via the indexing element and the machine is turned off.

It is claimed:

1. A lathe comprising a headstock, a live spindle supported in said headstock for rotational and axial movement, said live spindle being hollow and having a spindle head at its forward end for clampingly engaging bar stock extending through the hollow-spindle, clamp actuating means associated said spindle head for actuating said spindle heads for clamping and releasing said bar stock, and a bar stock feed and guide mechanism extending into said hollow-spindle from the rearward end thereof, said mechanism including a guide piece for the bar stock and a supporting member adapted to be mounted on the rearward end of the bar stock and supported in said guide piece, said support member and guide piece being operably coupled together so that the support member will move relative to said guide piece only during axial displacement in the feed direction of the live spindle when said spindle head is clamped onto said bar stock.

2. A lathe according to claim 1, wherein said guide piece has a stop means located immediately adjacent to said spindle head against which said supporting member is adapted to abut when the bar stock has been consumed, and a shut-off device responsive to said guide piece being in engagement with said stop means for shutting down the lathe.

3. A lathe according to claim 1, said guide piece has a tubular configuration, and said supporting member has a sliding portion which is applied with friction on the inside circumferential area of said guide piece and can be attached on the terminal end of the bar stock to be machined.

4. A lathe according to claim 3, which includes a stationary guide body, a receiving body located in said guide body and biased to a first position, a guide member displaceable in and coupled with said receiving body, the rearward end of said guide piece being rotatably supported in said guide member.

5. A lathe according to claim 4, wherein said shut-off device is located on said stationary guide body, and an indexing member is mounted on said receiving body for indexing said shut-off device after a predetermined axial displacement of said receiving body, said guide member being operable after a predetermined displacement from said first position to engage said indexing member to move said receiving body into its indexing position.

6. A lathe according to claim 5, wherein said stationary guide body is a hollow cylinder located coaxially of said live spindle, said receiving body is sleeve-shaped and is guided in an axially displaceable manner in said stationary guide body and is normally biased to said first position, said guide member is sleeve-shaped and is axially displaceable in said receiving body, and said guide piece is rotatably supported in said guide member by a ball bearing.

7. A lathe according to claim 6, wherein said receiving body includes a coupling device operable to couple the receiving body and guide member together for reciprocal movement, said coupling device including a piston rod movable radially into a radial recess in said guide member.

* * * * *